United States Patent [19]

Sugawara et al.

[11] Patent Number: 4,698,714
[45] Date of Patent: Oct. 6, 1987

[54] FLEXIBLE MAGNETIC DISC CASSETTE

[75] Inventors: Kokichi Sugawara, Miyagiken; Takayoshi Matsuzaka, Kanagawa, both of Japan

[73] Assignee: Sony Corporation, Tokyo, Japan

[21] Appl. No.: 727,375

[22] Filed: Apr. 25, 1985

[30] Foreign Application Priority Data

Apr. 28, 1984 [JP] Japan .................................. 59-87183
May 22, 1984 [JP] Japan .............................. 59-74592[U]

[51] Int. Cl.⁴ .................... G11B 23/033; G11B 5/016; G11B 3/70; B65D 85/30
[52] U.S. Cl. .................................... 360/133; 360/99; 206/444; 369/291
[58] Field of Search ............................ 360/133, 97–99, 360/135, 132; 206/444, 387; 369/291; 264/327, 328.16

[56] References Cited

U.S. PATENT DOCUMENTS

| 3,118,960 | 1/1964 | Cook | 264/327 |
| 3,974,252 | 8/1976 | Bischoff, Jr. | 264/327 |
| 4,517,617 | 5/1985 | Tsuji et al. | 360/133 |
| 4,544,977 | 10/1985 | Ozawa et al. | 360/133 |
| 4,546,397 | 10/1985 | Asami et al. | 360/133 |
| 4,579,225 | 4/1986 | Kato | 360/133 |

FOREIGN PATENT DOCUMENTS

| 137965 | 4/1985 | European Pat. Off. | 360/133 |
| 55-109640 | 8/1980 | Japan | 264/327 |

Primary Examiner—A. J. Heinz
Assistant Examiner—Matthew J. Bussan
Attorney, Agent, or Firm—Lewis H. Eslinger; Alvin Sinderbrand

[57] ABSTRACT

A magnetic disc cassette has a casing for enclosing a magnetic disc therein and a shutter provided on the casing and slideably moveable to expose or cover a head access opening in the casing. The shutter is molded from a synthetic resin to have a generally U-shaped cross section and has opposed edges which closely approach each other and are separated by less than the width of the casing when the shutter is removed from the casing.

3 Claims, 27 Drawing Figures

FLEXIBLE MAGNETIC DISC CASSETTE

FIELD OF THE INVENTION AND RELATED ART STATEMENT

The present invention relates to a magnetic disc cassette having a flexible magnetic disc enclosed in a hard casing and, more particularly, to a shutter for opening or closing an opening for insertion of a head.

There has been known a magnetic disc cassette in which a flexible magnetic disc having a diameter of, e.g., 3.5 inches is enclosed in a hard casing and digital data is recorded or reproduced in this state. A shutter for protection of the magnetic disc is slidably attached to this magnetic disc cassette so as to be freely opened or closed. Practically speaking, the shutter is opened only in the operating state and the magnetic disc is exposed from an elongated opening formed in the casing for insertion of the head. While, the shutter is closed in the non-operating state and the opening is also closed. Since the opening is closed in this way, introduction of foreign substance or dust into the casing is prevented, so that the magnetic disc in the casing is protected.

Hitherto, such a shutter has a U-shaped cross section and consists of metal, e.g., stainless steel. The shutter is formed with an elongated head access hole having substantially the same shape as the opening in the casing and the shutter is slidably attached to the casing. It is necessary to attach the shutter to the casing such that it can be smoothly slid but cannot be easily detached from the casing. In addition, it is also needed for the shutter to be uniformly and closely adhered to the outer surfaces of the casing and to prevent introduction of dust into the cassette by completing closing the opening of the casing. Therefore, it is required that a height of the opening portion of the shutter in the portion where the cassette casing is sandwiched and a height of a guide projection in the shutter are strictly determined so as to correspond to a standardized thickness of the cassette casing.

The conventional shutter is worked in a manner such that a flat plate of stainless steel is subjected to processes such as punching, bending, deburring, etc. However, since the flat stainless plate is preserved in the rolled state, a stress still remains and the plate could be deformed; thus, it is difficult to perform the work with high precision in the bending process.

On the other hand, the conventional shutter has a problem such that when the shutter is attached to the casing or when the shutter is slid along the hard casing, the hard casing could be scraped by the guide projection and the dust produced due to this enters the casing. Further, since metal material is used, it is difficult to color the shutter or to print a mark of a name of a manufacturing factory or the like on the shutter. As described above, in the conventional shutter, the number of manufacturing processes is large and a severe dimensional precision is required; therefore, its cost becomes high.

OBJECT AND SUMMARY OF THE INVENTION

It is an object of the present invention to provide a flexible magnetic disc cassette equipped with a low-priced shutter which can be easily manufactured to solve the foregoing drawback.

Another object of the invention is to provide a flexible magnetic disc cassette equipped with a shutter which is uniformly and closely adhered to the outer surfaces of the casing and thereby making it possible to prevent occurrence of a gap between the casing and the shutter.

Still another object of the invention is to provide a flexible magnetic disc cassette in which the casing is not scraped when the shutter is slided along the casing and introduction of dust into the casing hardly occurs.

According to the present invention, there is provided a flexible magnetic disc cassette comprising a magnetic disc, a casing including the magnetic disc, and a shutter which is slidably attached to the casing and can be set in the operating position or non-operating position, in which the shutter has an upper plate, a lower plate, a side plate which connects the upper and lower plates, and an opening formed in at least one of the upper and lower plates for insertion of a head, and these upper, lower and side plates and the opening are integrally formed from a synthetic resin material so as to have a U-shaped cross section and thereby to sandwich the casing.

The invention provides a flexible magnetic disc cassette equipped with a shutter having a shape such that in the state where it is removed from the casing, both of the upper and lower plates of the shutter closely approach with each other as they approach the non-coupling portion of the shutter.

As described above, the shutter has the shape such that the upper and lower plates closely approach the non-coupling portion. The invention therefore intends to control the cooling conditions for two metal molds adapted to come into engagement with each other when the shutter is molded from a synthetic resin.

In addition, the invention provides a flexible magnetic disc cassette which is integrally molded from a synthetic resin material by means of the metal molds of the shapes corresponding to the shape of the shutter in a manner such that both of the upper and lower plates closely approach with each other as they approach the non-coupling portion of the shutter.

The invention will be better understood from the following detailed description with reference to the accompanying drawings.

DETAILED DESCRIPTION OF PREFERRED EMBODIMENTS

Figure 1A:
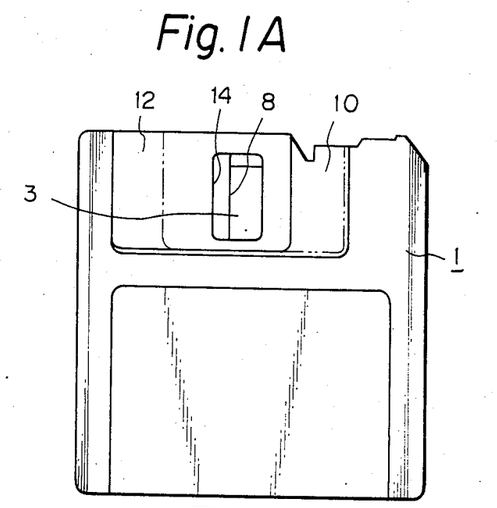
FIGS. 1A and 1B are a top view and a bottom view of one embodiment of the present invention.
Figure 1B:
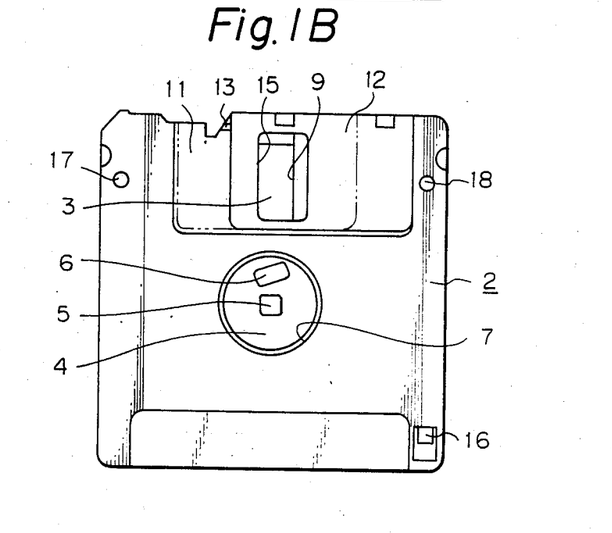

One embodiment of the present invention will now be described hereinbelow with reference to the drawings. Figs. 1A and 1B are a top view and a bottom view of an overall magnetic disc cassette in one embodiment of the invention. In these diagrams, a reference numeral 1 denotes an upper shell and 2 is a lower shell. These shells 1 and 2 are injection-molded from, for example, an ABS resin containing an antistatic agent. Liners of unwoven fabric such as rayon are adhered to the inner surfaces of the upper and lower shells 1 and 2 by heat sealing or ultrasonic sealing in order to prevent dropout of signals from the magnetic disc during rotation, as well as to prevent abrasion and generation of static electricity of the magnetic disc. The outer peripheries of the upper and lower shells 1 and 2 are joined together by the untrasonic sealing. A magnetic disc 3 is enclosed in the casing which consists of these shells 1 and 2 coupled integrally. The magnetic disc 3 consists of a thin and flexible disc-shaped base film of a high polymeric material and a magnetic layer uniformly formed at least on the bottom surface of the base film. A ring-shaped center plate 4 is fixed in a circular hole formed at the center of the magnetic disc 3. A motor shaft inserting hole 5 of substantially the square shape is formed at the center of the center plate 4. A rectangular position regulating pin inserting hole 6 is formed at the position which is deviated from the inserting hole 5 by only a predetermined distance. A circular opening 7 is formed at the center of the lower shell 2 and the center plate 4 is slightly loosely arranged in the opening 7. Elongated holes 8 and 9 are formed in the upper and lower shells 1 and 2 and the magnetic disc 3 is exposed through the holes 8 and 9.

Figure 2A:
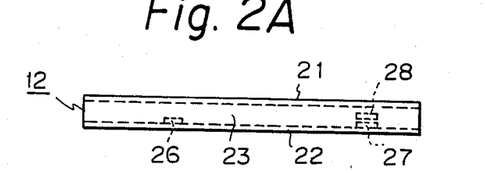
FIGS. 2A to 2C are a front view, a bottom view and a side elevational view of a shutter in one embodiment of the invention.
Figure 2B:
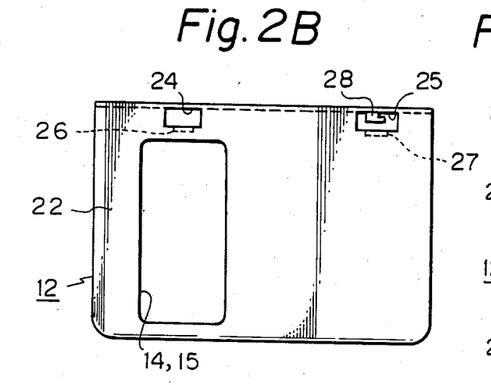
Figure 2C:
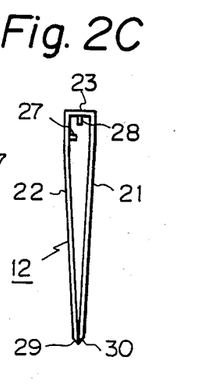

Recesses 10 and 11 are formed in the outer surfaces of the upper and lower shells 1 and 2 including the portions where the elongated holes 8 and 9 are formed. A shutter 12 having a U-shaped cross section as shown in FIGS. 2A to 2C is slidably attached in the recesses 10 and 11. A guide groove 13 is formed along the side peripheral portion of the outer surface of the lower shell 2. A projection which protrudes inwardly from the shutter 12 is guided along the guide groove 13. In Figs. 1A and 1B, the shutter 12 is slided and can be set into the operating state as shown by solid lines or the non-operating state as indicated by alternate long and two short dashes lines. Practically speaking, in the operating state, the positions of the elongated head access hole 9, elongated hole 8 for insertion of a head pad and elongated head access holes 14 and 15 formed in the shutter 12 coincides, so that the magnetic disc 3 is exposed outside. On the contrary, in the non-operating state, the elongated holes 8 and 9 are closed and the magnetic disc 3 is covered by the shutter 12. The magnetic disc 3 is protected and introduction of dust is prevented by use of the shutter 12.

Further, an erroneous erasure prevention lug 16 is arranged at one corner of the lower shell 2. Information recorded on the magnetic disc 3 is protected if the lug 16 is removed. A pair of positioning holes 17 and 18 for positioning the magnetic disc cassette in a disc recorder are formed at two corners of the lower shell 2. The hole 17 is the elongated hole, thereby permitting a slight error in the position of the hole. The other two corners of the lower shell 8 at which the positioning holes 17 and 18 are not formed serve as reference surfaces. Thus, the magnetic disc cassette is supported at the reference position with reference to the four points at those corners. In this state, the magnetic disc 3 is rotated by a motor to record or reproduce digital signals or analog signals.

Figure 3:
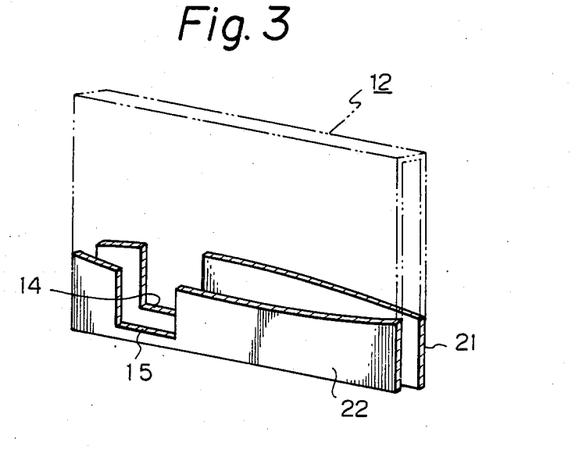
FIG. 3 is a schematic cross sectional view of the shutter in the embodiment of the invention.

FIGS. 2A to 2C are a front view, a bottom view and a side elevational view of the shutter 12. An upper plate 21, a side plate 23 and a lower plate 22 of the shutter 12 are integrally injection-molded. The shutter 12 consists of a thermoplastic synthetic resin, e.g., polyoxymethylene resin having an excellent flexibility, low frictional resistance and relatively high strength. The shutter 12 has a U-shaped cross section and in the state where it is removed from the casing, as shown in FIGS. 2C and 3, the upper and lower plates 21 and 22 closely approach as they approach the open ends of the front and side surfaces.

The elongated holes 14 and 15 are formed in the upper and lower plates 21 and 22. The lower plate 22 is formed with, for instance, two rectangular notches 24 and 25. Guide projections 26 and 27 are formed along the inner peripheries of the notches 24 and 25 so as to face the side plate 23. A spring stop projection 28 is formed to protrude inwardly from the side plate 23. Corners of the outer surfaces of peripheral portions 29 and 30 at the periphery of the shutter 12 are cut away at least on the side of the open end thereof.

The shutter 12 is attached to the casing in a manner such that its open end is widened and the casing can be inserted from this open end. In this state, the shutter 12 sandwiches the casing in a manner such that the inner surfaces of the upper and lower plates 21 and 22 are closely adhered to the surfaces of the upper and lower shells 1 and 2. A spring is interposed between the inside of the side plate 23 of the shutter 12 and the edge surface of the casing. The elongated holes 8 and 9 are opened or closed in association with the sliding of the shutter 12 along the recesses 10 and 11 of the upper and lower shells 1 and 2. In the non-operating state of the magnetic disc cassette, the elongated holes 8 and 9 are closed by the upper and lower plates 21 and 22 of the shutter 12 due to the tension of the spring interposed between the shutter 12 and the cassette casing, so that the magnetic disc 3 is covered by the shutter 12.

As described above, the upper and lower plates 21 and 22 of the shutter 12 closely approach as they approach the peripheries of the open end of the shutter. Consequently, the inner surfaces of the upper and lower plates 21 and 22 are uniformly adhered to the bottom surfaces of the recesses 10 and 11 of the upper and lower shells 1 and 2.

Figure 4A:
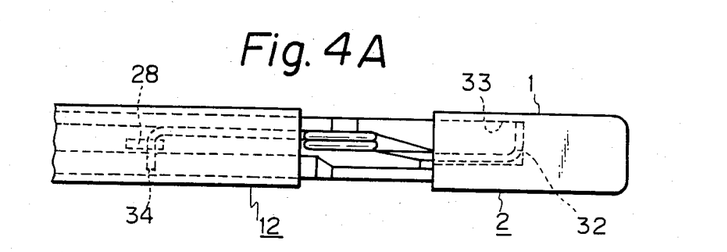
FIGS. 4A and 4B are partially enlarged views of the shutter in the embodiment of the invention.
Figure 4B:
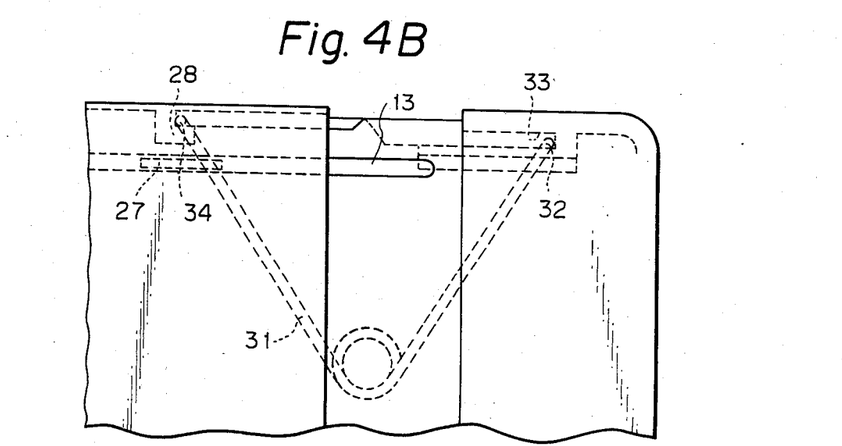

FIGS. 4A and 4B show partially enlarged views of the magnetic disc cassette shown in FIG. 1. The projection 27 of the shutter 12 is slidably inserted in the guide groove 13 and the projection 26 is similarly slidably inserted in the guide groove 13 (not shown). One end 32 of a spring 31 is inserted in a recess 33 formed in the cassette shell and is stopped here. The other end 34 of the spring 31 is stopped by means of the projection 28 of the shutter 12.

FIGS. 4A and 4B show the state in that the shutter 12 is set at the non-operating position by the spring 31. Upon operation, when the magnetic disc cassette is installed in the disc recorder, the shutter 12 is automatically slided against the spring force of the spring 31 by means of the operating section of the disc recorder in association with the sliding operation for installation at this time. Then, the positions of the elongated holes 14 and 15 of the shutter 12 and the positions of the elongated holes 8 and 9 of the upper and lower shells 1 and 2 coincide and the operating state is provided.

Figure 5:
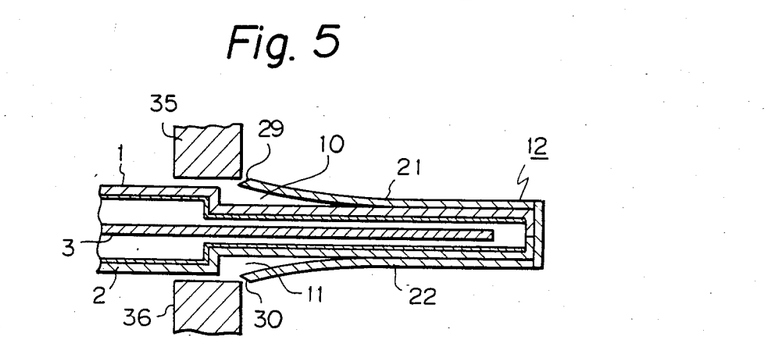
FIG. 5 is a cross sectional view for use in explanation upon loading of the embodiment of the invention.

The upper and lower plates 21 and 22 of the shutter 12 could be warped outwardly due to a time-dependent change or the like. If these plates 21 and 22 are warped outwardly, they won't be uniformly and closely adhered to the recesses 10 and 11 when the shutter 12 is attached to the casing, so that the peripheries of the shutter 12 will have been apart from the recesses 10 and 11. In such a floating state, if the magnetic disc cassette is tried to be inserted into the disc recorder, the floating peripheries and the regulating portions of the inserting port of the disc recorder come into contact, so that there is a possibility such that the magnetic disc cannot be smoothly loaded. However, in this embodiment, the corners of the outer surfaces of the peripheries 29 and 30 on the side of the open end of the shutter 12 are cut away as mentioned before. Therefore, as shown in FIG. 5, even if the edges of regulating portions 35 and 36 of the inserting port of the disc recorder come into contact with the peripheries 29 and 30, the magnetic disc can be smoothly loaded.

The shutter 12 is, for example, injection-molded in a manner such that a synthetic resin is injected from a gate into a space which is formed by means of two metal molds consisting of a core and a cavity.

As illustrated in FIGS. 6 to 11, the metal molds for this purpose comprise: a core 42 and a cavity 44 to form the overall shape of the shutter 12; slide cores 51 and 52 to respectively form the elongated head access holes 14 and 15 of the shutter 12; a slide core 55 to form the projection 26 of the shutter 12; and a slide core 56 to form the projections 27 and 28 of the shutter 12.

The notch 24 corresponding to the position of the slide core 55 is produced to form the projection 26 in the shutter 12. The notch 25 corresponding to the position of the slide core 56 is produced to form the projections 27 and 28 in the shutter 12. The projection 27 is formed in contact relation with the periphery of the notch 25. The projection 28 protrudes from the side plate 23 inwardly into the inner space corresponding to the position of the notch 25. Therefore, both of the two projections 27 and 28 can be formed by means of the single slide core 56.

Figure 6A:
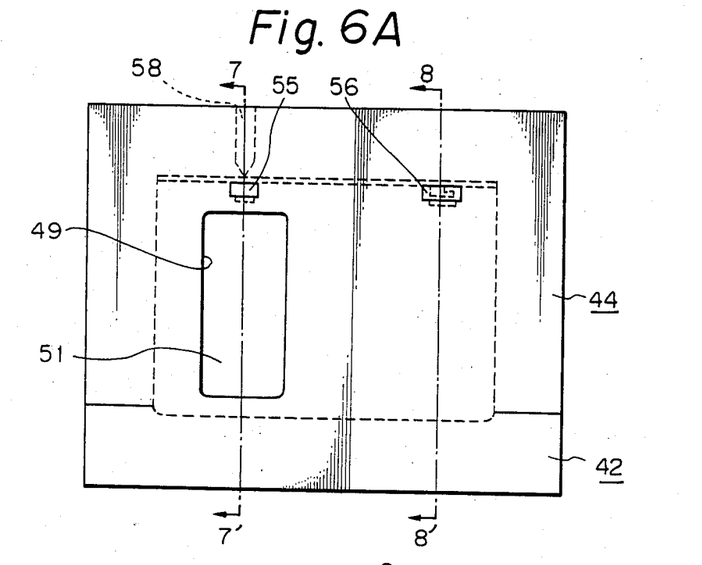
FIGS. 6A and 6B are a front view and a side elevational view of one example of metal molds to mold the shutter in the embodiment of the invention.
Figure 6B:
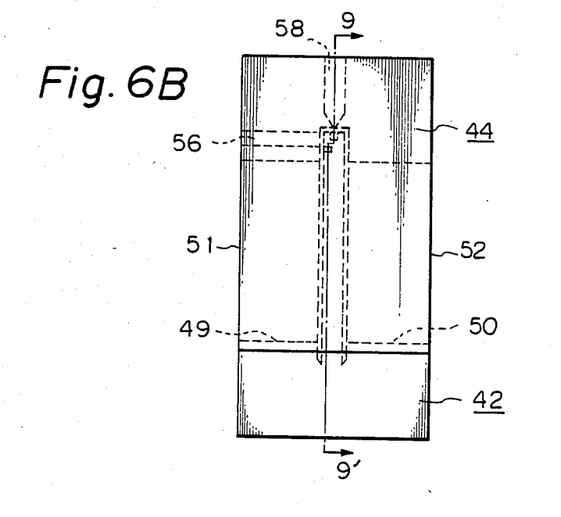
Figure 7:
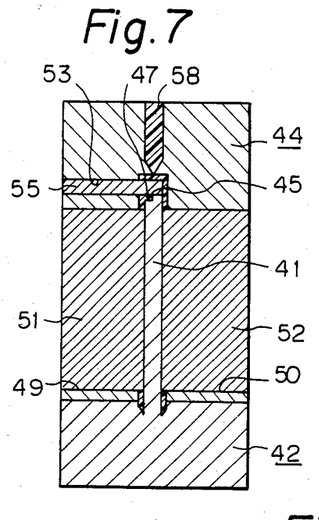
FIGS. 7 to 9 are cross sectional views of one example of metal molds to mold the shutter in the embodiment of the invention.
Figure 8:
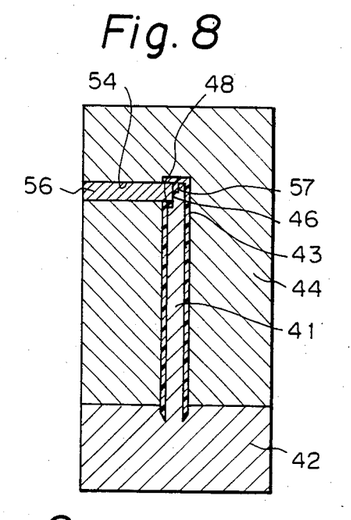
Figure 9:
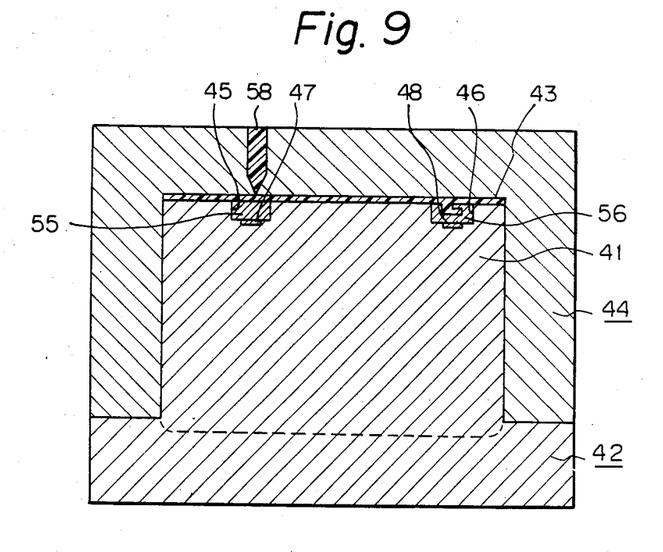

FIGS. 6A and 6B are a front view and a side elevational view of the metal molds to mold the shutter 12 mentioned above. FIG. 7 is a cross sectional view taken along the line 7—7' in FIG. 6. FIG. 8 is a cross sectional view taken along the line 8—8' in FIG. 6. FIG. 9 is a cross sectional view taken along the line 9—9' in FIG. 6. The core 42 adapted to be inserted into the cavity 44 has a protuberance portion 41 having a similar shape as the inner space that is defined by the upper, lower and side plates 21 to 23 of the shutter 12. At the top of the cavity 44, a gate 58 through which the molten synthetic resin is injected into the metal molds is formed.

As shown in FIG. 9, concave portions 45 and 46 into which the edges of the slide cores 55 and 56 are inserted are formed at the edge surface of the protuberance portion 41 of the core 42. As shown in FIG. 7, the concave portion 45 has a depth which is equal to a width of the protuberance portion 41. As shown in FIG. 8, the concave portion 46 has a depth until the position where the projection 28 is formed. Step portions 47 and 48 are formed at the bottom surfaces of the concave portions 45 and 46. The step portions 47 and 48 have shapes corresponding to the projections 26 and 27, respectively.

Slide core inserting ports 49 and 50 having shapes corresponding to the elongated holes 14 and 15 of the shutter 12 are formed in the front and back surfaces of the cavity 44. The slide cores 51 and 52 are slided through the inserting ports 49 and 50. As shown in FIGS. 7 and 8, slide core inserting ports 53 and 54 into which the rod-shaped slide cores 55 and 56 are respectively inserted are formed in the front portion of the cavity 44. The positions of the slide cores 55 and 56 correspond to the notches 24 and 25 of the shutter 12. As shown in FIG. 8, a step portion 57 of a shape corresponding to the projection 28 of the shutter 12 is formed at the edge of the protuberance portion 41 of the core 42 in contact with the edge of the slide core 56.

For instance, the molten polyoxymethylene resin is injected from the gate 58 into the foregoing metal molds and this resin flows into the gap between the cavity 44 and the core 42 into which the slide cores 51, 52, 55, and 56 were inserted. The resin is then cooled and solidified in the metal molds. In this case, the surface temperatures of the metal molds are set such that the surface temperature of the cavity 44 becomes lower than that of the core 42. Consequently, the solidification is started from the resin around the cavity 44.

Figures 10, 11:
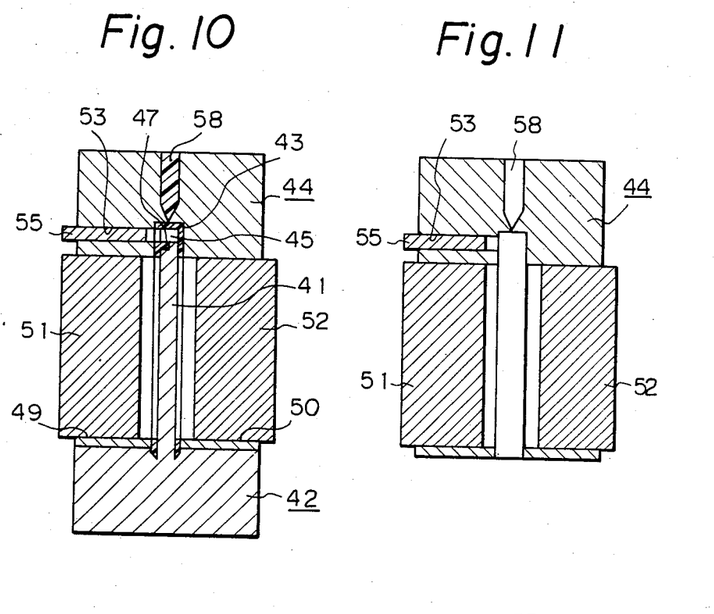
FIGS. 10 and 11 are cross sectional views for use in explanation of one example of the metal molds to form the shutter in the embodiment of the invention.

After the fluid resin was cooled and solidified in the metal molds, as shown in FIG. 10, the slide cores 51, 52, 55, and 56 are laterally slided out by only predetermined distances, so that the metal molds consisting of the core 42 and cavity 44 are separated as shown in FIG. 11. The shutter 12 of the shape as shown in FIG. 2 mentioned before is taken out from those metal molds. Eventually, by allowing the fluid resin to flow into the gap between the cavity 44 and core 42, the upper, lower and side plates 21 to 23 are formed.

As shown in FIGS. 6A and 6B. since the slide cores 51 and 52 have been inserted into the cavity 44, no resin flows into these portions, so that the elongated holes 14 and 15 are formed here. Also, since the slide cores 55 and 56 have been inserted into the core 44, no resin flows into these portions, so that the notches 24 and 25 are formed here. Since the step portion 47 has been formed in the concave portion 45 at the edge of the protuberance portion of the core 42, the gap is formed due to the step portion 47 in the portion where the core 42 and the slide core 55 come into contact and the resin flows into this gap, so that the projection 26 is formed.

As shown in FIGS. 7 to 9, since the step portion 48 has been formed in the concave portion 46 at the edge of the protuberance portion 41 of the core 42, the gap is formed due to the step portion 48 in the portion where the core 42 and the slide core 56 come into contact and the resin flows into this gap, so that the projection 27 is formed. At the same time, since the step portion 57 has been formed at the edge of the protuberance portion 41, the resin flows into the step portion 57, so that the projection 28 is formed.

As described above, the surface temperatures of the metal molds are controlled such that the surface temperature of the cavity 44 is lower than that of the core 42, so that the resin near the portion which is in contact with the surface of the cavity 44 is solidified faster than the resin near the portion which is in contact with the surface of the core 42. Therefore, the volume of the resin near the core 42 is reduced after the reduction of the volume of the resin near the cavity 44. This distortion is released after the shutter was taken out from the metal molds, so that this causes the shutter 12 to be warped inwardly such that the open end of the shutter becomes narrow as shown in FIGS. 2C and 3.

The present invention is not limited to the shutter as in the foregoing embodiment in which the slide cores 55 and 56 are inserted from the front side and thereby to form the notches 24 and 25, but the invention can be applied to the shutter in which the slide cores are inserted from both sides and the notches 24 and 25 are not formed. FIGS. 12 to 17 illustrate the metal molds to integrally mold a shutter without producing the notches 24 and 25 as mentioned above. In FIGS. 12 to 17, the similar parts and components of the shutter as those shown in the shutter 12 are designated by the same reference numerals except the notches 24 and 25.

The metal molds comprise: a core 61 and a cavity 63; slide cores 69 and 70 to respectively form the elongated holes 14 and 15 of the shutter; and slide cores 73 and 74 to form the projections 26 to 28 of the shutter.

Figure 12A:
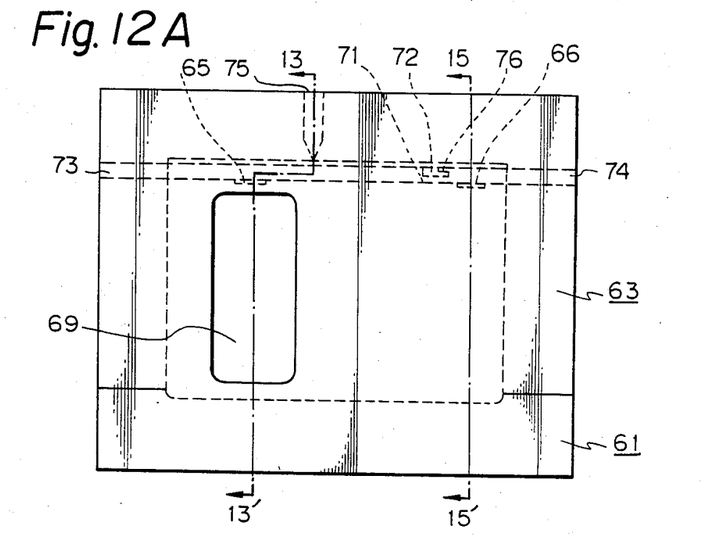
FIGS. 12A and 12B are a front view and a side elevational view of another example of metal molds to mold the shutter in the embodiment of the invention.
Figure 12B:
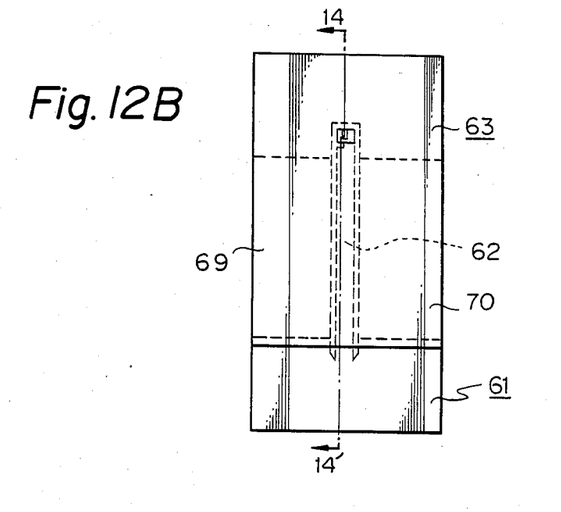
Figure 13:
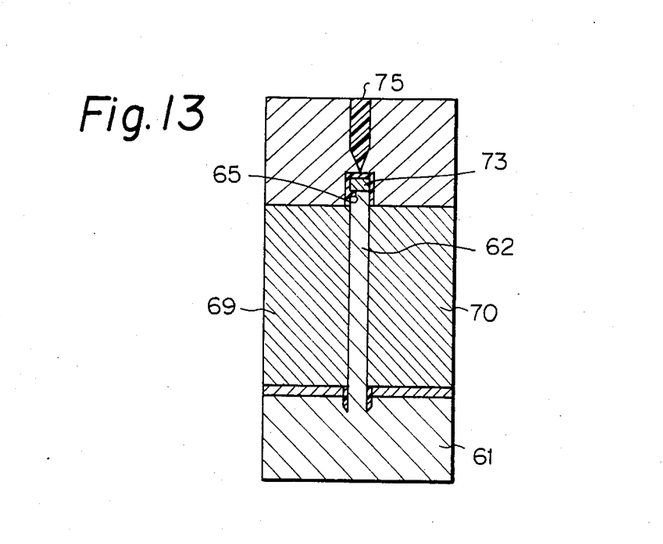
FIGS. 13 to 15 are cross sectional views of another example of the metal molds to mold the shutter in the embodiment of the invention.
Figure 14:
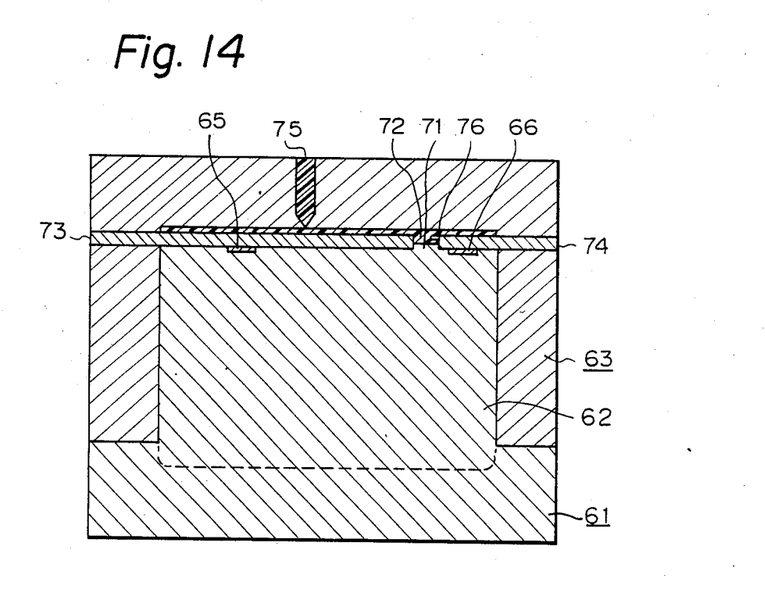
Figure 15:
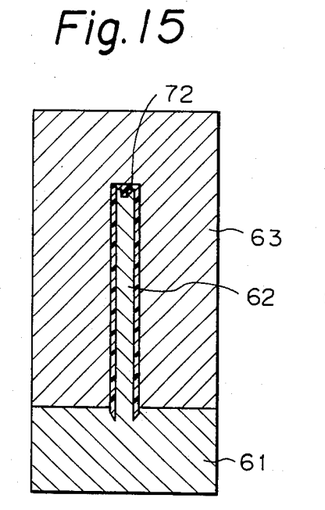

FIGS. 12A and 12B are a front view and a side elevational view of the metal molds. FIG. 13 is a cross sectional view taken along the line 13—13' in FIG. 12. FIG. 14 is a cross sectional view taken along the line 14—14' in FIG. 12. FIG. 15 is a cross sectional view taken along the line 15—15' in FIG. 12. The overall shape of the shutter is formed by the cavity 63 and the core 61 having a protuberance portion 62 adapted to be inserted into the cavity 63.

Step portions 65 and 66 having shapes corresponding to the projections 26 and 27 of the shutter are formed at the edge of the protuberance portion 62 of the core 61. In addition, a projection 71 is formed at the edge of the protuberance portion 62. A groove 72 having a width which is substantially equal to the thickness of the projection 28 of the shutter is formed in the projection 71.

The core 61 is inserted into the cavity 63. Four slide core inserting ports are formed in the cavity 63. The slide cores 69 and 70 are respectively inserted into these slide core inserting ports. The shapes of the edges of the slide cores 69 and 70 correspond to the elongated holes 14 and 15 of the shutter. The slide cores 73 and 74 are respectively inserted through those ports. A projection 76 is formed at the edge of the other slide core 74.

Figure 16:
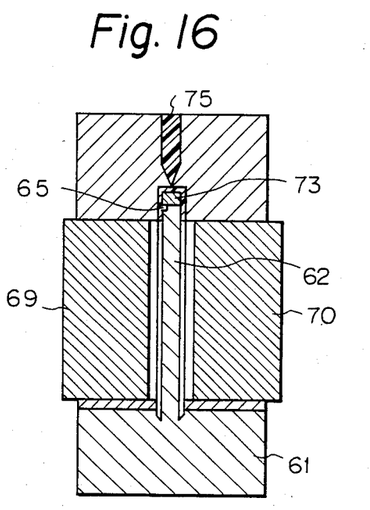
FIGS. 16 to 18 are cross sectional views for use in explanation of another example of the metal molds to mold the shutter in the embodiment of the invention.
Figure 17:
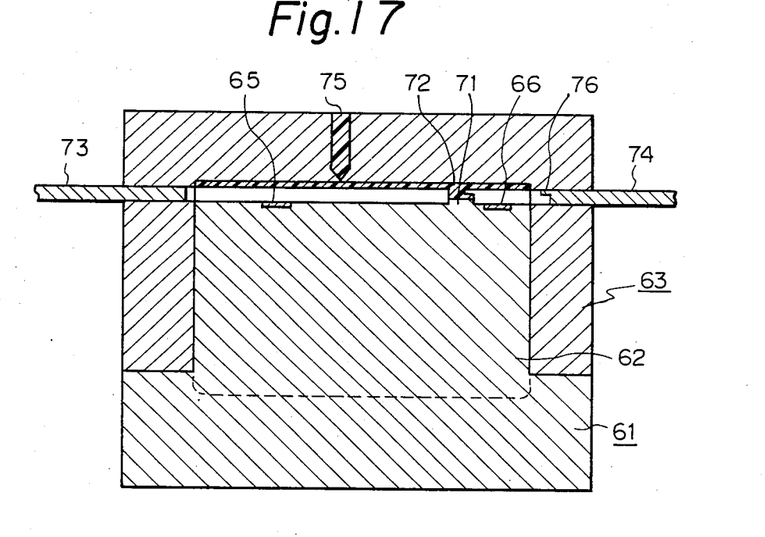
Figure 18:
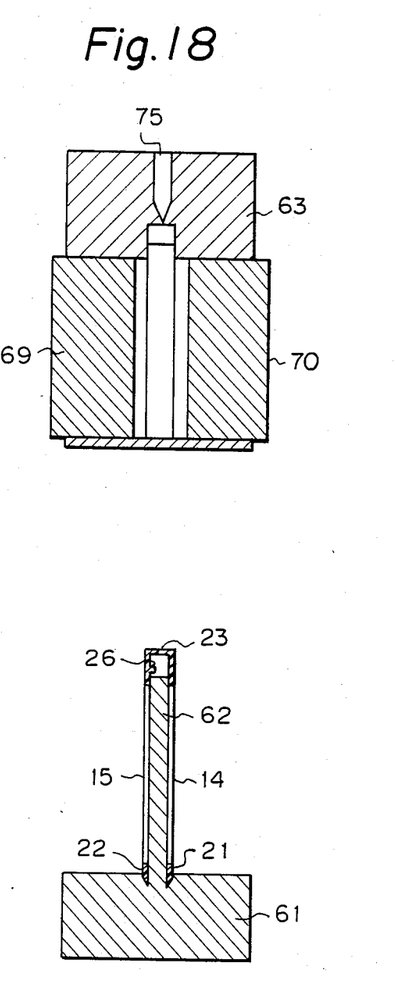

Similarly to the example of the foregoing metal molds, the fluid resin is injected from a gate 75. The injected resin flows into the gap in the metal molds and is solidified. The slide cores 69 and 70 are slided by only predetermined distances as shown in FIG. 16. The slide cores 73 and 74 are likewise slided as shown in FIG. 17. The core 61 is pulled out from the cavity 63, so that both of the core and cavity are separated as shown in FIG. 18. The shutter is molded in this way.

Namely, the resin flows from the gate 75 into the gap between the core 61 and the cavity 63, so that the upper, lower and side plates 21, 22 and 23 of the shutter are formed. Since the slide cores 69 and 70 have been inserted into this gap, no resin flows into these portions, so that the elongated holes 14 and 15 are formed. Since gaps are formed by the step portions 65 and 66 in the contacting surfaces among the edge surface of the protuberance portion 62 of the core 61 and the slide cores 73 and 74, by allowing the resin to flow into these gaps, the projections 26 and 27 are formed, respectively. The resin flows into the gap formed by the groove 72 formed in the projection 71 of the protuberance portion 62 and the projection 76 formed on the slide core 74, so that the projection 28 is formed.

By controlling the surface temperatures of the core 61 and cavity 63 when the synthetic resin is solidified in a similar manner as above, in the state where the shutter was removed from the casing of the disc cassette, the peripheries of the upper and lower plates 21 and 22 of the shutter are warped inwardly, respectively.

Figure 19:
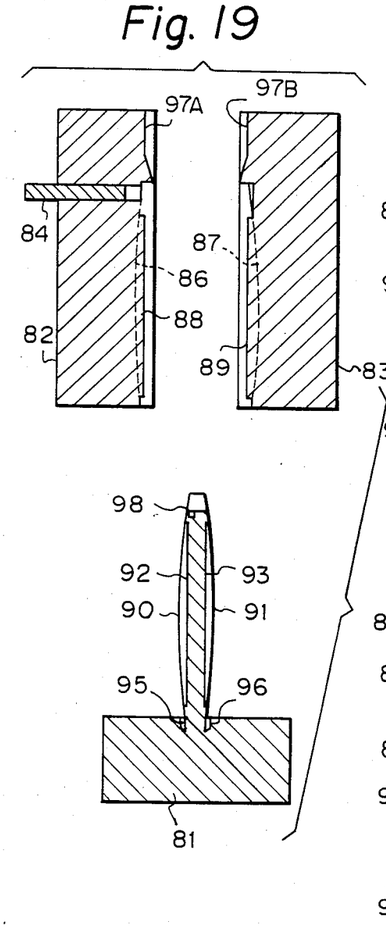
FIGS. 19 to 21 are cross sectional views of still another example of metal molds to mold the shutter in the embodiment of the invention.
Figure 20:
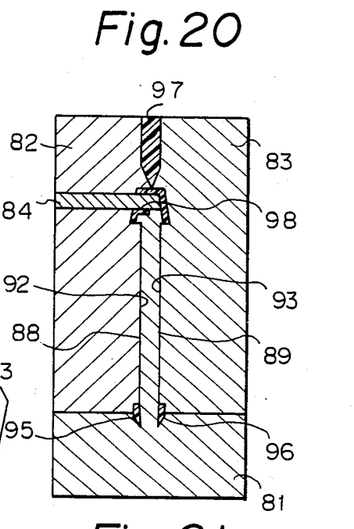
Figure 21:
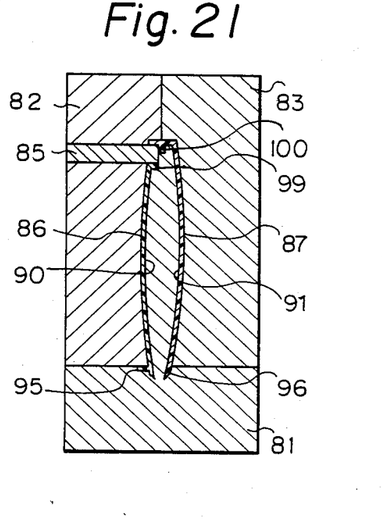

Further another embodiment of the molding process of the shutter will then be described. As shown in FIGS. 19 to 21, the metal molds for injection molding comprise: a core 81 and cavities 82 and 83 to form the overall shape of the shutter 12; a slide core 84 to form the projection 26 of the shutter 12; and a slide core 85 to form the projections 27 and 28 of the shutter 12.

The notch 24 corresponding to the position of the slide core 84 is produced to form the projection 26 in the shutter 12. The notch 25 corresponding to the position of the slide core 85 is produced to form the projections 27 and 28 in the shutter 12. The projection 27 is formed in contact with the periphery of the notch 25. The projection 28 protrudes from the side plate 23 into the inner space corresponding to the position of the notch 25. Therefore, both of the two projections 27 and 28 can be formed by means of the single slide core 85. On the other hand, to form the elongated holes 14 and 15 of the shutter 12, convex portions 88 and 89 having shapes corresponding to these holes 14 and 15 are formed in the cavities 82 and 83, while concave portions 92 and 93 having shapes corresponding to the convex portions 88 and 89 are formed in the core 81.

The slide cores 84 and 85 are inserted into the cavity 82 and the cavities 82 and 83 are brought into engagement with the core 81. A gate 97 is formed in the metal molds constituted in this way by means of grooves 97A and 97B of the cavities 82 and 83. In addition, a gap is formed by concave portions 86 and 87 of the cavities 82 and 83, convex portions 90 and 91 of the core 81, and grooves 95 and 96 of the core 81. This gap corresponds to the external shape of the shutter 12. Further, a gap of a shape corresponding to the projection 26 of the shutter 12 is formed by the slide core 84 and a step portion 98 of the core 81. Gaps of shapes corresponding to the projections 27 and 28 of the shutter 12 are formed by the slide core 85 and step portions 99 and 100 of the core 81. The molten synthetic resin is injected from the gate 97 of the metal molds and this synthetic resin flows into the gaps in the metal molds. This resin is cooled in the metal molds and is solidified to have the shape corresponding to the gaps in the metal molds.

The gap in the metal molds formed by the concave portions 86 and 87 of the cavities 82 and 83, convex portions 90 and 91 of the core 81, and grooves 95 and 96 of the core 81 conforms with the external shape of the shutter 12. Consequently, as shown in FIGS. 2A to 2C and 3, the shutter 12 of the shape having a U-shaped cross section in which both of the upper and lower plates 21 and 22 closely approach as they approach the open end of the shutter is molded by the above-mentioned gap.

On the other hand, as shown in FIG. 20, the convex portions 88 and 89 of the cavities 82 and 83 and the concave portions 92 and 93 of the core 81 form the portions in the metal molds where no synthetic resin flows into. The elongated holes 14 and 15 of the shutter 12 are formed in correspondence to these portions. Further, the gap which is formed by the slide core 84 and step portion 98 of the core 81 corresponds to the projection 26 of the shutter 12 as shown in FIG. 20. Therefore, the projection 26 is formed by this gap. In addition, the gaps which are formed by the slide core 85 and the step portions 99 and 100 of the core 81 correspond to the projections 27 and 28 of the shutter 12 as shown in FIG. 21. Therefore, the projections 27 and 28 are formed by these gaps. By inserting the slide cores 84 and 85, the portions in the metal molds where no synthetic resin flows into are formed. The notches 24 and 25 are formed in the shutter 12 by these portions According to the present invention. the shutter is injection-molded from a synthetic resin; therefore, the manufacturing processes can be simplified and the manufacturing costs can be made low. Also, since the shutter is molded from a synthetic resin, when the shutter is loaded into the casing or when the shutter is slided along the casing, the casing is not scraped by the shutter and therefore introduction of dust which is produced due to the scraping into the casing is prevented. The peripheries of the upper and lower plates of the shutter are warped inwardly such that both of these plates closely approach as they approach the non-coupling portion, so that the head inserting port of the casing and the pad inserting port can be completely closed by the shutter. Moreover, since the corners of the peripheries of the shutter on the side of its open end are cut, the magnetic disc cassette can be smoothly loaded into the disc recorder. Consequently, according to the invention, it is possible to realize a low-priced flexible magnetic disc cassette equipped with a shutter which has an excellent operational easiness and which can certainly protect the magnetic disc in the casing.

Although the present invention has been shown and described with respect to preferred embodiments, various changes and modifications which are obvious to a person skilled in the art to which the invention pertains are deemed to lie within the spirit and scope of the invention.

What is claimed is:

1. A magnetic disc cassette comprising:
    a magnetic disc;
    a casing for enclosing said magnetic disc therein and including a head access opening; and
    a shutter provided on said casing and slidably moveable between an operating position at which it exposes said head access opening and a non-operating position at which it covers said head access opening;
    said shutter including substantially rectangular upper and lower plates and a side plate which joins said upper and lower plates along respective first edges thereof with a predetermined spacing therebetween so that said shutter has a generally U-shaped cross section within which said casing is fittingly received;
    at least one of said upper and lower plates having a shutter opening through which said head access opening is exposed for insertion of a head when said shutter is in said operating position;
    said upper plate, said lower plate and said side plate of said shutter being integrally molded from a synthetic resin material so as to have said U-shaped cross section; and
    both said upper and lower plates having second edges opposed to the respective first edges which closely approach each other and are separated by less than said predetermined spacing when said shutter is removed from said casing, whereby said first edges of said upper and lower plates are biased toward said casing when said shutter is fitted onto said casing.

2. A magnetic disc cassette according to claim 1, wherein said casing has a groove formed therein and a selected one of said upper and lower plates of said shutter has a projection formed thereon and adapted to be inserted into said groove to guide said shutter on said casing.

3. A method for manufacturing a shutter for a magnetic disc cassette having a magnetic disc and a casing for enclosing said magnetic disc therein and including a head access opening, said shutter being provided on said casing to be slideably moveable between an operating position at which it exposes said head access opening and a non-operating position at which it covers said head access opening, said shutter including substantially rectangular upper and lower plates and a side plate which joins said upper and lower plates along respective first edges thereof with a predetermined spacing therebetween so that said shutter has a generally U-shaped cross section within which said casing is fittingly received, at least one of said upper and lower plates having a shutter opening through which said head access opening is exposed for insertion of a head when said shutter is in said operating position, said upper plate, said lower plate and said side plate of said shutter being integrally molded from a synthetic resin material so as to have said U-shaped cross section and both said upper and lower plates having second edges opposed to the respective first edges which closely approach each other and are separated by less than said predetermined spacing when said shutter is removed from said casing, whereby said first edges of said upper and lower plates are biased toward said casing when said shutter is fitted onto said casing;
    said method comprising the steps of:
    defining an internal space within said U-shaped cross section formed by said upper, lower and side plates of said shutter by inserting a first metal mold therein;
    defining outer surfaces of said plates by bringing a second metal mold into spaced engagement with said first metal mold, the volume between said first and second molds corresponding to said shutter;
    flowing said synthetic resin material into said volume between said first and second molds to form said shutter; and
    separately controlling the temperatures of said first and second molds so as to cause said second edges of said upper and lower plates to closely approach each other at less than said predetermined spacing after formation and removal of said shutter from said molds.

* * * * *